(12) United States Patent
Niese

(10) Patent No.: US 6,604,453 B2
(45) Date of Patent: Aug. 12, 2003

(54) STEAM PRESSURE COOKER

(76) Inventor: Ursula Niese, Vogalsnard 17, 57745 Grumbach (DE)

(*) Notice: Subject to any disclaimer, the term of this patent is extended or adjusted under 35 U.S.C. 154(b) by 0 days.

(21) Appl. No.: 10/254,331

(22) Filed: Sep. 25, 2002

(65) Prior Publication Data

US 2003/0015533 A1 Jan. 23, 2003

Related U.S. Application Data

(63) Continuation of application No. PCT/DE01/00958, filed on Mar. 13, 2001.

(30) Foreign Application Priority Data

Mar. 27, 2000 (DE) .......................... 100 14 766

(51) Int. Cl.[7] .............................. A23L 1/00; A47J 27/00; A47J 27/08; A47J 27/09; B65D 45/00
(52) U.S. Cl. .................... 99/337; 99/403; 220/314; 220/316; 220/325; 220/912
(58) Field of Search .................... 99/325–333, 337, 99/338, 403–410, 444–450, 483; 126/369, 20, 377.1, 378.1, 373.1, 374.1, 388.1, 389.1, 39 G, 39 R; 220/314, 316, 325, 393, 293, 592, 246, 287, 912; 292/256.67, 256.69; 426/510, 511, 523; D7/391, 538

(56) References Cited

U.S. PATENT DOCUMENTS

| | | | | | |
|---|---|---|---|---|---|
| 2,549,387 A | * | 4/1951 | Richeson | .................... | 220/316 |
| 4,024,982 A | * | 5/1977 | Schultz | ................... | 220/293 |
| 4,135,640 A | * | 1/1979 | MacQuilkin et al. | ....... | 220/316 |
| 4,161,260 A | * | 7/1979 | Lagostina | .................... | 220/319 |
| 4,162,741 A | * | 7/1979 | Walker et al. | ............... | 220/203 |
| 4,574,988 A | * | 3/1986 | Karliner | .................... | 220/316 |
| 4,711,366 A | * | 12/1987 | Chen | ........................... | 99/337 |
| 4,733,795 A | * | 3/1988 | Boehm | ....................... | 220/316 |
| 4,796,776 A | * | 1/1989 | Dalquist et al. | ............ | 220/203 |
| 4,932,550 A | * | 6/1990 | Moucha | ....................... | 99/403 |
| 5,048,400 A | * | 9/1991 | Ueda et al. | ................... | 99/403 |
| 5,370,257 A | * | 12/1994 | Chameroy et al. | ...... | 220/293 X |
| 5,678,721 A | * | 10/1997 | Cartigny et al. | .......... | 99/337 X |
| 6,019,029 A | | 2/2000 | Chan | | |

FOREIGN PATENT DOCUMENTS

| | | |
|---|---|---|
| DE | 33 27 439 | 2/1985 |
| DE | 40 26 166 | 2/1992 |
| EP | 0 139 772 | 7/1987 |
| EP | 0 108 203 | 2/1988 |
| EP | 0 491 324 | 6/1992 |
| EP | 0 691 096 | 2/1997 |
| EP | 0 691 097 | 8/1997 |

* cited by examiner

Primary Examiner—Timothy F. Simone
(74) Attorney, Agent, or Firm—Henry M. Feiereisen

(57) ABSTRACT

A steam pressure cooker, includes a pot with a horizontal pouring rim, a lid for closing the pot, and an elastic seal positioned between the lid and the pot. At least two moveable clamps are arranged peripherally in even spaced-apart relationship, for clamping the lid and the pouring rim, when the steam pressure cooker is closed, and clearing the pouring rim, when the steam pressure cooker is opened. The clamps and the lid are covered by a cap which supports a handle comprised of two handle parts, which are respectively connected to the cap and the lid. Actuation of the handle effects a coaxial rotation of the cap relative to the lid between two end positions, whereby in one end position the clamps are moved outwards, until the pouring rim is cleared. A tip clamping mechanism secures the cap relative to the lid in the end positions.

6 Claims, 3 Drawing Sheets

STEAM PRESSURE COOKER

CROSS-REFERENCES TO RELATED APPLICATIONS

This application is a continuation of prior filed copending PCT International application no. PCT/DE01/00958, filed Mar. 13, 2001, which was published in English and which designated the United States and on which priority is claimed under 35 U.S.C. §120, the disclosure of which is hereby incorporated by reference.

This application claims the priority of German Patent Application Serial No. 100 14 766.6, filed Mar. 27, 2000, pursuant to 35 U.S.C. 119(a)–(d), the disclosure of which is incorporated herein by reference.

BACKGROUND OF THE INVENTION

The present invention relates, in general, to a steam pressure cooker.

A steam pressure cooker is known having a pot with a horizontal pouring rim, which is angled outwards. A lid can be placed upon the pot for closing the pot. Positioned between lid and pot is a rubberized elastic sealing element. At least two moveable clamps, spaced evenly about the circumference, embrace and thereby clamp the lid and the pouring rim, when the steam pressure cooker is closed, and clear the pouring rim, when the steam pressure cooker is opened. The clamps and lid are covered by a cap which has a handle attached thereon.

European Pat. No. EP 0 691 097 B1 describes a device for controlling the opening and closing of clamp jaws for locking the lid upon a pot, whereby the clamp jaws are radially moveable and attached to a lid via engagement arms, which in turn are radially moveable. The control mechanism has a control element which is moveable at the lid in a substantially radial direction by a predetermined distance between a first position in which the clamp jaws are in the locking position and a second position in which the clamp jaws are in the disengaged position. This construction is very complicated and thus prone to high maintenance.

European Pat. No. EP 0 691 096 B1 describes a similar device, in which the clamp jaws are locked by means of a valve plug which can move to upper or lower positions in dependence on a pressure in the pot.

European Pat. No. EP 0 139 772 B1 describes a steam pressure cooker having a lid assembly comprised of a lower lid portion and an upper lid portion, with the upper lid portion having two half-lids which are turnable relative to the lower lid and lower pot around an axis of rotation that is parallel to the vertical, geometric central axis of the pot, wherein the axes of rotation are eccentric to the central axis, and in relation to the central axis are diametrically opposite to each other in a rotation part which is rotatably mounted centrally in the lower lid. When opened, the two half-lids execute a semicircular movement corresponding to their eccentric position on the rotation part, until the crimping of the lid assembly no longer grips underneath the rim of the pot. This type of steam pressure cooker is also very complex.

European Pat. No. EP 0 108 203 B1 describes a steam pressure cooker including a cap which grips underneath the rim in overlapping relationship and bears against a seal on the underside of the rim in such a way that the relative position of the cap and seal under the pressure inside the pot and because of the sealing action and frictional resistance, prevents the opening actuation of the locking elements by the cap, and only allows opening when there is low residual pressure because of raising of the cap from the seal.

German Pat. No. DE 40 26 166 A1 and international publication WO 92/03080 describe a steam pressure cooker in which a control button is mounted on the lid for axial movement. When the control button is moved axially in the closing direction, the locking segments are pulled radially inwards into the locking position. In this way, the cooking pot can be closed manually by pressing the control button.

It would be desirable and advantageous to provide an improved steam pressure cooker which obviates prior art shortcomings and which can be opened and closed with one hand while being of simple structure and easy to maintain.

SUMMARY OF THE INVENTION

According to one aspect of the present invention, a steam pressure cooker, includes a pot with a horizontal pouring rim angled outwards; a lid placed upon the pot for closing the pot; a rubberized elastic seal positioned between the lid and the pot; at least two moveable clamps, arranged peripherally in even spaced-apart relationship, for embracing and thereby clamping the lid and the pouring rim, when the steam pressure cooker is closed, and clearing the pouring rim, when the steam pressure cooker is opened; a cap for covering the clamps and the lid; a handle placed upon the cap, and comprised of two handle parts, with one handle part connected to the cap and the other handle part connected to the lid, wherein an opening of the steam pressure cooker is implemented through actuation of the handle to thereby effect a coaxial rotation of the cap relative to the lid between two end positions, whereby in one end position the clamps, which are positioned in their respective horizontal plane between the lid and the cap, are moved outwards, until the pouring rim is cleared for opening the steam pressure cooker; and a tip clamping mechanism for securing the cap relative to the lid in the end positions.

Thus, an easy-to-use, one-handed operational and, to a great extent, maintenance-free mechanical system is created, which enables the steam pressure cooker to be easily opened and closed as well as easily maintained.

According to another feature of the present invention, there is provided a conversion element for moving the clamps. Conversion elements are functional elements that, within a functional flow, assume the task to change the magnitude and direction of specific parameters, such as path, angle of rotation, speed and acceleration, in dependence on the task at hand. In the present case, the conversion element translates the movement initiated in the handle into a movement of the clamps.

According to another feature of the present invention, the conversion element may be a sliding gear having a driving pin positioned on the lid and a driving pin arranged under the cap for sliding engagement in complementary slots in the clamps. Such construction can easily be realized and is substantially error-proof or fail-proof, making it suitable for use in a steam pressure cooker. Suitably, each clamp has two slots.

According to another feature of the present invention, the tip clamping mechanism may include a preloaded spring and hinge pins positioned on the lid and underneath the cap. This tip clamping mechanism holds the cap relative to the lid in the desired end position. A tip clamping mechanism is a spring-loaded gear with a limited range of movement. In the tilted position, the spring tension reaches a maximum, while the gear is in a labile equilibrium.

According to another feature of the present invention, the coaxial rotation of the cap can be realized by pressing together the handle parts of the handle. This enables ergonomic operation of the steam pressure cooker. The user only needs to press together the two handle parts in order to close and open the lid.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
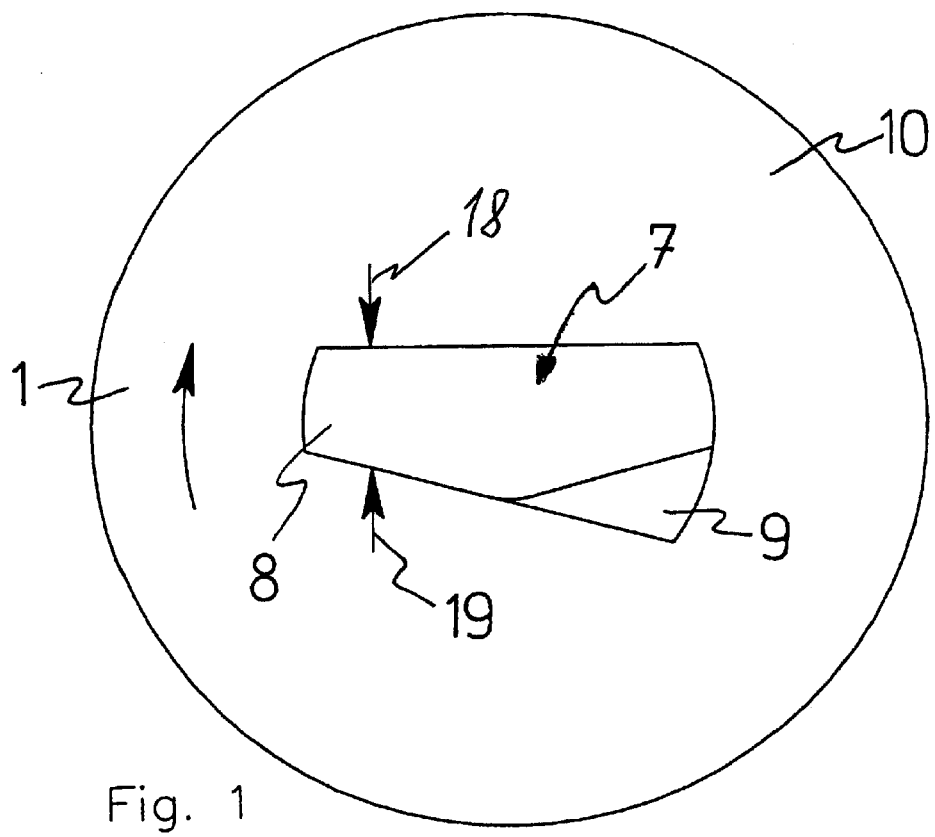
FIG. 1 is a top view of a steam pressure cooker according to the present invention in closed state.

Throughout all the Figures, same or corresponding elements are generally indicated by same reference numerals.

Figure 4:
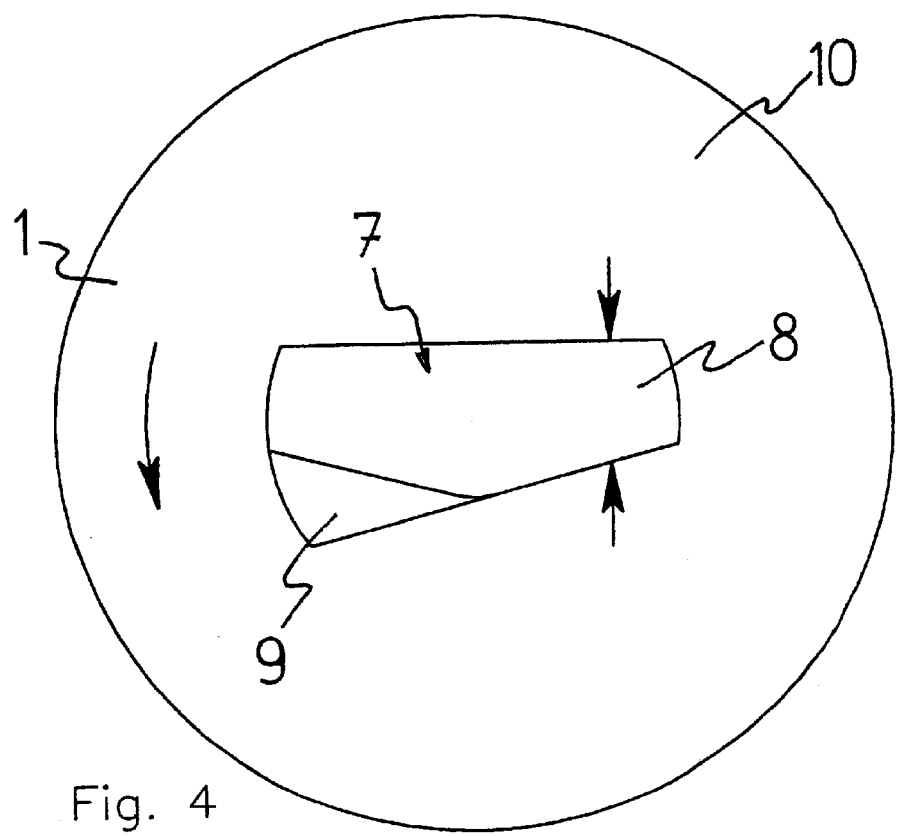
FIG. 4 is a top view of the steam pressure cooker in open position.

Turning now to the drawing, and in particular to FIGS. 1 and 4, there is shown a steam pressure cooker 1 according to the present invention, including a lid 2 having a two-part handle, generally designated by reference numeral 7, with one handle part 8 connected to the lid 2 and the other handle part 9 connected to a cap 10. To close the steam pressure cooker 1, a user presses together one end of the handle (arrow 19), whereas an opening of the steam pressure cooker 1 is realized by pressing the other end together (arrow 18).

Figure 2:
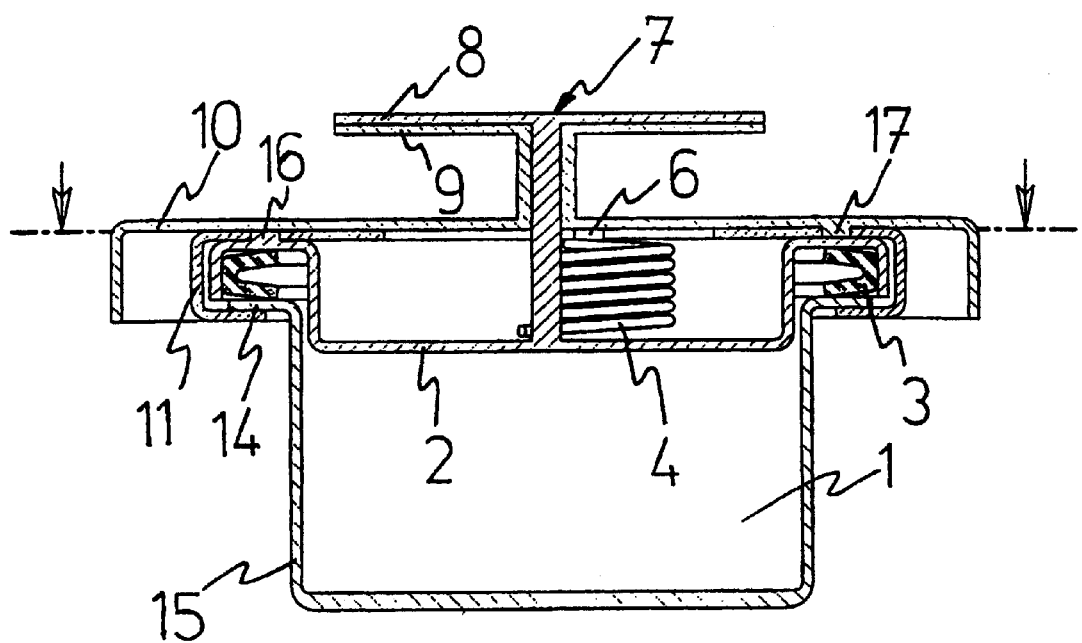
FIG. 2 is a vertical section of the closed steam pressure cooker, with the driving pins shown turned in the section plane for ease of illustration.
Figure 5:
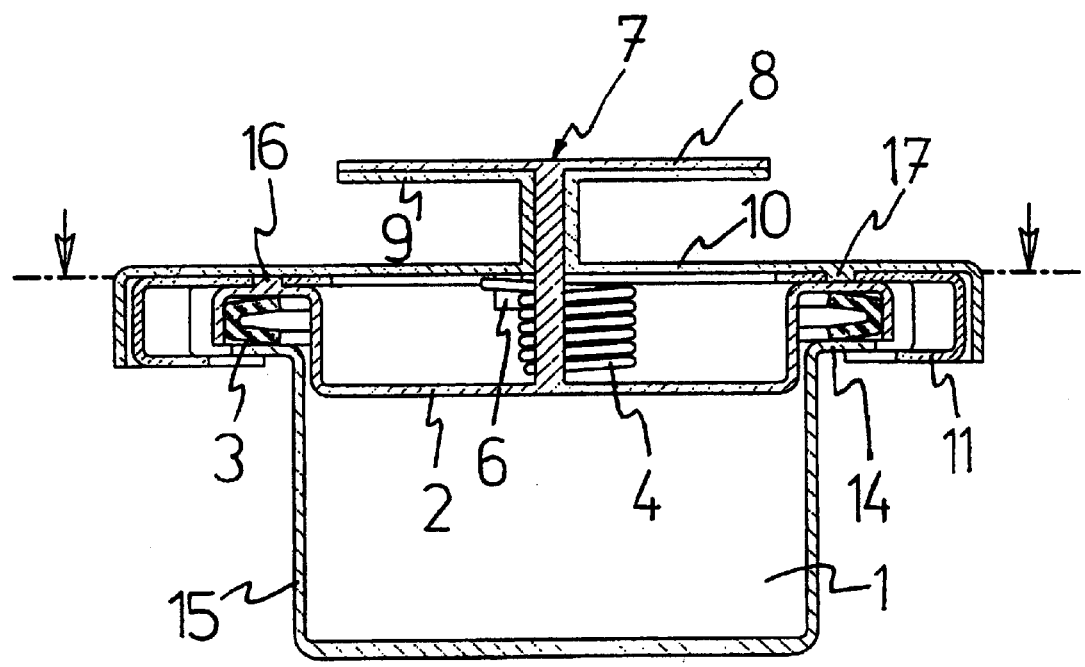
FIG. 5 is a vertical section of the open steam pressure cooker, with clamps and driving pins shown turned in the section plane for ease of illustration.

FIGS. 2 and 5 show the steam pressure cooker 1 in closed and opened states, respectively. The steam pressure cooker 1 has a pot 15 with a horizontal pouring rim 14, which is angled outwards. The pot 15 is closed by means of the lid 2, which has a circumferential seal 3 bearing against the pouring rim 14 when the lid 2 is placed upon the pot 15. The lid 2 can be closed by clamps 11, which are positioned above the lid 2 and embrace the pouring rim 14 in closed state and clear the pouring rim 14 in opened state. The cap 10 is arranged above the clamps 11 to thereby cover the clamps 11 and the lid 2, with the handle 7 positioned on the cap 10. The handle part 8 of the lid 2 extends from the center of the lid 2 through the cap 10 and the handle part 9 of the cap 10, whereby the horizontal section of the handle part 8 of the lid 2 is positioned above the horizontal section of the handle part 9 of the cap 10, so that the lid 2 and the cap 10 are positioned around the central symmetry axis.

Vertical driving pins 16, 17, projecting upwards from the lid 2 and downwards from the cap 10, engage and slide in complementary slots 12, 13 of the clamps 11. This enables a rotation between the cap 10 and the lid 12, induced through actuation of the handle 7, to thereby slide the clamps 11 to move outwardly or inwardly as a result of the slantingly outwards directed slots 12, 13, whereby the clamps 11 clear or clamp the pouring rim 14. The clamps 11 are thus shifted via a sliding gear, comprised of the driving pins 16, 17 and the slots 12, 13 and acting here as a conversion element.

Each clamp 11 has two slots 12, 13 for the two driving pins 16, 17 of the lid 2 and the cap 10, respectively.

For opening the steam pressure cooker 1, actuation in the direction of arrow 18 causes the cap 10 to be coaxially turned relative to the lid 2, whereby the clamps 11, which are positioned in their respective horizontal plane between the lid 2 and the cap 10, are moved outwards by means of the conversion element, thereby clearing the pouring rim 14. For closing the steam pressure cooker, actuation in the direction of arrow 19 causes the cap 10 to be turned relative to the lid 2 in the reverse direction, whereby the clamps 11 are moved inwards, thus embracing and clamping the pouring rim 14.

A preloaded spring 4 and hinge pins 5, 6, positioned on the lid 2 and underneath the cap 10, form a tip clamping mechanism which securely holds the cap 10 relative to the lid 2 in the desired end position.

Figure 3:
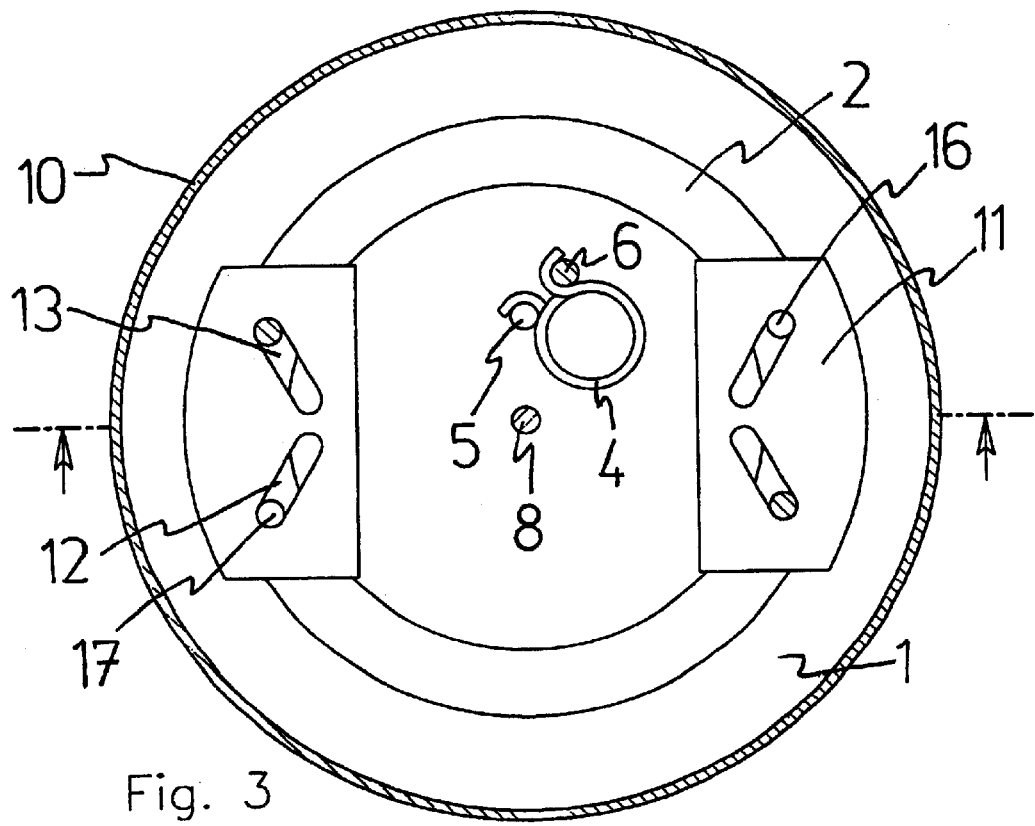
FIG. 3 is a horizontal section of the closed steam pressure cooker corresponding to the section plane in FIG. 2.
Figure 6:
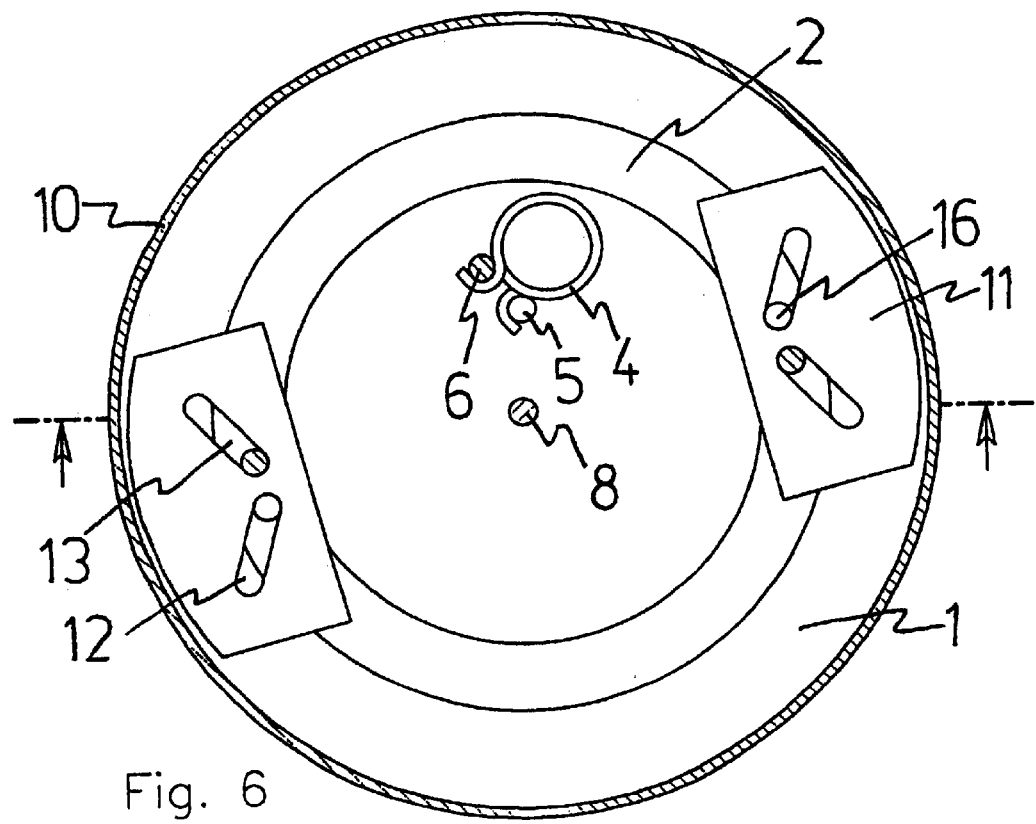
FIG. 6 is a horizontal section of the closed steam pressure cooker corresponding to the section plane in FIG. 5.

FIGS. 3 and 6 illustrate the interaction between the two respective slots 12, 13 of the clamps 11 with the corresponding driving pins 16, 17 of the lid 2 and the cap 10, when the lid 2 and the cap 10 are coaxially turned relative to one another. Furthermore, the spring 4 with the corresponding hinge pins 5, 6 of the lid 2 and the cap 10 can be seen here.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A steam pressure cooker, comprising:
   a pot with a horizontal pouring rim angled outwards;
   a lid placed upon the pot for closing the pot;
   a rubberized elastic seal positioned between the lid and the pot;
   at least two moveable clamps, arranged peripherally in even spaced-apart relationship, for embracing and thereby clamping the lid and the pouring rim, when the steam pressure cooker is closed, and clearing the pouring rim, when the steam pressure cooker is opened;
   a cap for covering the clamps and the lid;
   a handle placed upon the cap, and comprised of two handle parts, with one handle part connected to the cap and the other handle part connected to the lid, wherein an opening of the steam pressure cooker is implemented through actuation of the handle to thereby effect a coaxial rotation of the cap relative to the lid between two end positions, whereby in one end position the clamps, which are positioned in their respective horizontal plane between the lid and the cap, are moved outwards, until the pouring rim is cleared; and
   a tip clamping mechanism for securing the cap relative to the lid in the end positions.

2. The steam pressure cooker of claim 1, and further comprising a conversion element for moving the clamps.

3. The steam pressure cooker of claim 2, wherein the conversion element is a sliding gear having a driving pin positioned on the lid and a driving pin arranged under the cap for sliding engagement in complementary slots in the clamps.

4. The steam pressure cooker of claim 2, wherein each clamp has two slots.

5. The steam pressure cooker of claim 1, wherein the tip clamping mechanism includes a preloaded spring and hinge pins positioned on the lid and underneath the cap.

6. The steam pressure cooker of claim 1, wherein the coaxial rotation of the cap is realized by pressing together the handle parts of the handle.

* * * * *

UNITED STATES PATENT AND TRADEMARK OFFICE
CERTIFICATE OF CORRECTION

PATENT NO. : 6,604,453 B2
DATED : August 12, 2003
INVENTOR(S) : Ursula Niese

It is certified that error appears in the above-identified patent and that said Letters Patent is hereby corrected as shown below:

Title page,
Item [76], Inventor, replace "Vogalsnard 17" with -- Vogelsherd 17 -- and replace "57745 Grumbach" with -- 67745 Grumbach --

Signed and Sealed this

Ninth Day of November, 2004

JON W. DUDAS
*Director of the United States Patent and Trademark Office*